United States Patent [19]

Kotzab

[11] Patent Number: 4,816,011
[45] Date of Patent: Mar. 28, 1989

[54] TENSIONING DEVICE FOR BELTS AND THE LIKE, IN PARTICULAR ON MOTOR VEHICLE ENGINES

[76] Inventor: Werner Kotzab, Heinestrasse 7, D-8720 Schweinfurt, Fed. Rep. of Germany

[21] Appl. No.: 195,001

[22] Filed: May 17, 1988

[30] Foreign Application Priority Data

May 18, 1987 [DE] Fed. Rep. of Germany ....... 3716570

[51] Int. Cl.⁴ ............................................. F16H 7/12
[52] U.S. Cl. .................................... 474/111; 474/135
[58] Field of Search .............. 474/101, 109, 111, 113, 474/117, 118, 133, 135, 140, 77, 79

[56] References Cited

U.S. PATENT DOCUMENTS 4,473,362 9/1984 Thomey et al. ................ 474/133 X
4,536,172 8/1985 Burris et al. ........................ 474/135
4,563,167 1/1986 Foster ............................. 474/133 X
4,601,683 7/1986 Foster ............................. 474/133 X Primary Examiner—Thuy M. Bui
Attorney, Agent, or Firm—Browdy & Neimark

[57] ABSTRACT

In a tensioning device for belts and the like, in particular on motor vehicle engines, including at least two housing parts that can be swivelled relative to one another, one of which can be mounted in a stationary manner, it is provided, for the sake of unproblematic storage and reliable automatable mounting, that a screw element penetrates the housing parts in such a way that a threaded portion of the screw element protrudes freely from the stationary housing, wherein the screw element engages a bore of a plate of plastic, cardboard or the like joined to the stationary housing.

6 Claims, 10 Drawing Sheets

TENSIONING DEVICE FOR BELTS AND THE LIKE, IN PARTICULAR ON MOTOR VEHICLE ENGINES

BACKGROUND OF THE INVENTION

1. Field of the Invention

The invention is directed to a tensioning device for belts and the like, in particular on motor vehicle engines, including at least two housing parts swivelable relative to one another, one of which can be mounted so as to be stationary.

2. The Prior Art

Tensioning devices of this type are used primarily on motor vehicle engines, in order to lend the belt an approximately constant tension regardless of the particular operating state, and to absorb and damp vibration and shocks to the belt.

Since known devices of this type comprise at least two housing parts swivelable relative to one another and thus not firmly joined to one another, care must be taken when they are stored, so that all the parts of such a device will remain together. This is particularly onerous when shipping them to the storage place and in the unloading process, which sometimes is done automatically.

Mounting a multiple-part entity of the known type on a motor vehicle engine is even more problematic, because such constructions are unsuitable or at best poorly suited to automated mounting, and even mounting them manually takes a comparatively long time.

SUMMARY OF THE INVENTION

Taking this as the point of departure, the object of the invention to make a tensioning device, of the type initially described above, easy to handle and in particular to make it capable of being mounted in an automated process; for structural simplification, the mounting parts should also perform additional functions beyond those of simply mounting the device.

According to the invention, this object is attained in that a screw element penetrates the housing parts such that a threaded portion protrudes freely from the stationary housing, the screw element engaging a bore in a plate made of plastic, cardboard or the like joined to the stationary housing. A thread corresponding to the external thread of the screw element may be cut beforehand into the bore of such a plate, or can be tapped by the screwing-in of the screw element itself, or the disk can simply be pressed on. In each case, in this way all the housing parts are held together by the screw axially penetrating them, because as a rule the head of the screw element rests on the outer, movable housing part, while the thread, via the plate, retains the other housing part, which is to be mounted so as to be stationary.

By means of the selection of the material of the plate, the pre-assembled, practically one-piece tensioning device can thus be simply mounted on a threaded bore, a welded-on nut or some arbitrary protrusion of the engine, simply by rotating the screw element farther so that the thread of the plate is stripped.

It is advantageously provided that the screw element forms the swivel bearing, or centrally penetrates it. In this way, the screw element not only peforms the function of holding the housing parts together and fixing them in position in the final mounting, but at the same time serves as a stable swivel bearing construction securely anchored to the housing.

In order not to have to use an expensive rotating tool for the screw element, it can be provided that the screw element includes a conventional screw and a sheath partially fitting over it. These two latter parts can favorably be coated and can easily be assembled together in order to attain the desired configuration.

In a construction of the tensioning device in which its belt diversion wheel is at least partially in alignment in the axial direction with the housing parts, or in other words where the swivel arm used is very short, a further feature of the invention provides that the belt diversion wheel has a opening for actuating the screw element.

BRIEF DESCRIPTION OF THE DRAWINGS

Further characteristics, advantages and details of the invention will become apparent from the ensuing description of a preferred embodiment, taken in conjunction with the drawings in which.

DESCRIPTION OF THE PREFERRED EMBODIMENTS

Figure 1:
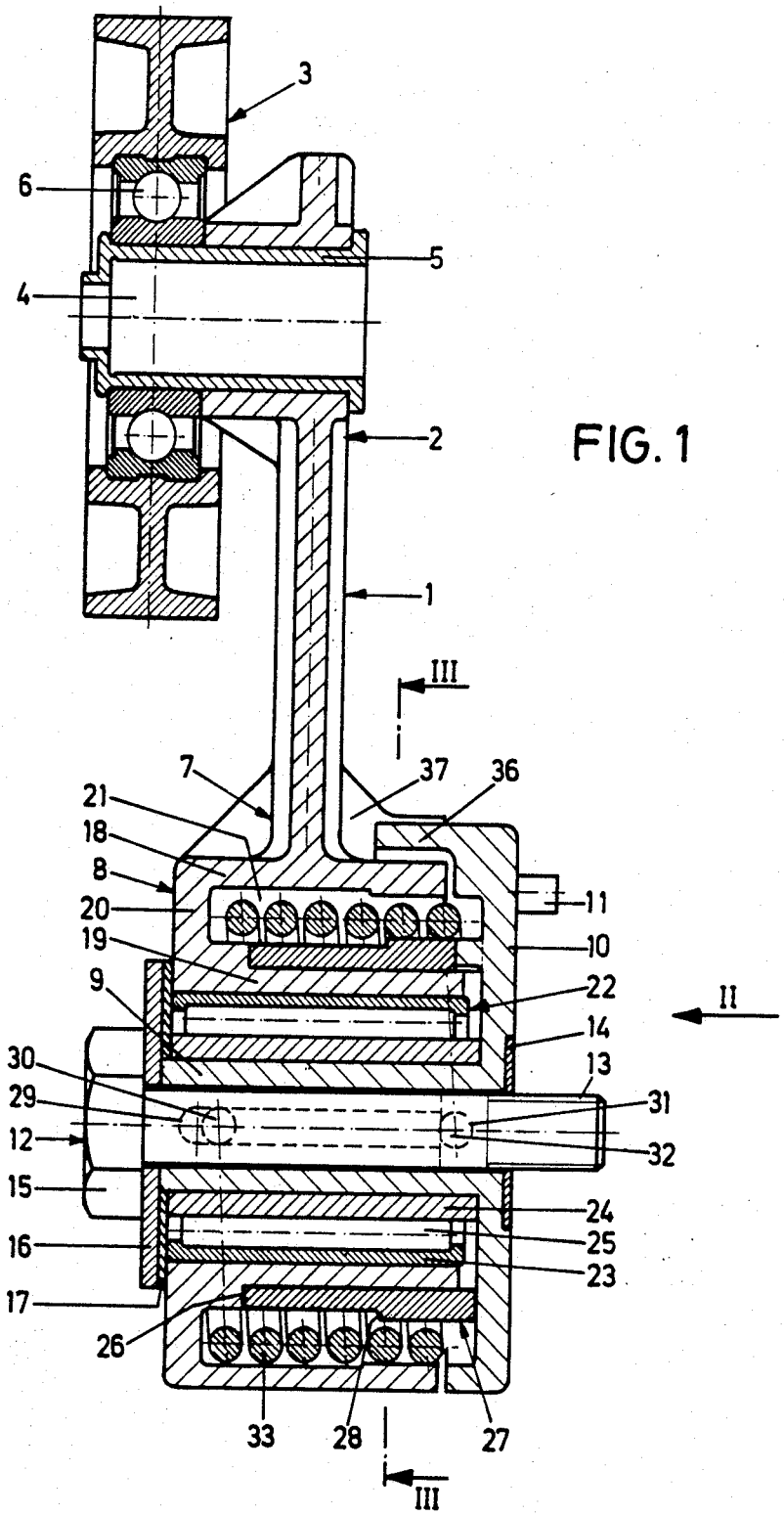
FIG. 1 is a longitudinal section through the entire device according to the invention, taken along the line I—I of FIG. 2.
Figure 2:
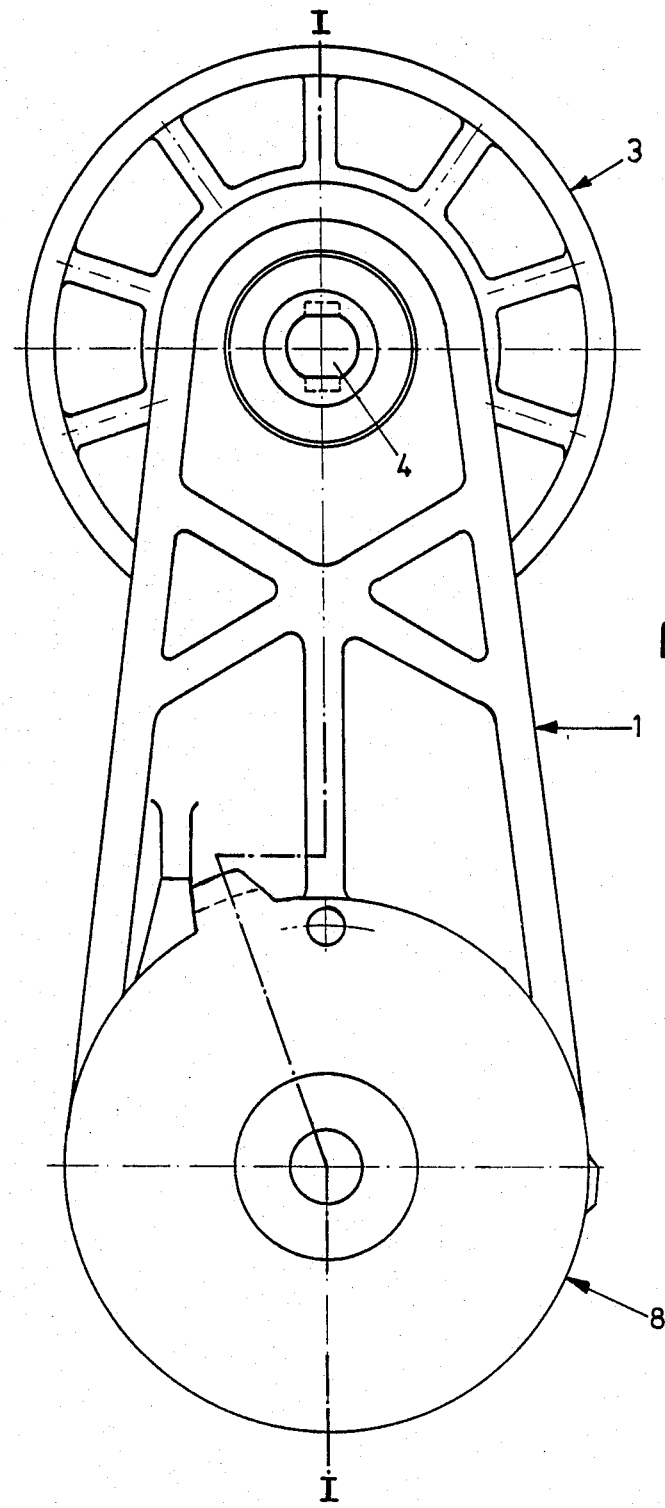
FIG. 2 is a view in the direction of the arrow II in FIG. 1.

A device according to the invention includes a swivel arm 1, on one end 2 of which a belt diversion wheel 3 is rotatably supported on a hub 5, having an opening 4 provided with axial protrusions, by means of a ball bearing 6. The diversion wheel 3 has a double-U profile, in a known manner. The opening 4 makes it possible to engage the hub 5 with a tool during assembly.

Disposed on the other end 7 of the swivel arm 1 is a swivel arm housing 8, which cylindrically surrounds a bearing bush 9 that is connected to a stationary housing 10, in the exemplary embodiment being integrally embodied with this housing, the stationary housing 10 closing off the swivel arm housing 8.

The stationary housing 10 has a protrusion 11, which for rotationally fixed connection is inserted into a corresponding recess in a vehicle engine or the like. A screw element 12 axially penetrates the bearing bush 9 and has a threaded portion 13 that protrudes beyond the stationary housing 10, the threaded portion engaging a plastic washer 14 disposed in countersunk fashion on the back side of the housing 10.

The housing 10 and the swivel arm housing 8 are held together by this plastic washer 14, on the one hand, and the screw head 15 or a metal shim 16 beneath the screw head and a rubber washer 17, so that the entire device can be stored and used for assembly pusposes as a compact unit. For assembly, the screw element 12 is rotated, and the threaded portion 13 is thereby screwed into a corresponding threaded bore on the engine. In this rotation, the thread and the plastic washer 14 is overtightened, which because of the softness of the material can be done without difficulty and without damage to the threaded portion 13.

The swivel arm housing 8 has an outer cylindrical section 18, which is connected to the swivel arm 1, as well as an inner cylindrical section 19 spaced apart from the outer cylindrical section; these sections 18 and 19 are joined via a radially extending end wall section 20, forming an annular gap 21 that is open toward the housing 10.

A roller bearing 22 is fitted into the inner cylindrical section 19, including roller bearing housing parts 23 and 24 and pins 25. The outer roller bearing housing part 23 is fixed to the inner cylindrical section 19 of the swivel arm housing 8 so as to prevent relative rotation with respect to one another, and the inner roller bearing housing part 24 is likewise fixed to the bearing bush 9 so that these element are rotationally fixed with respect to one another.

The inner cylindrical section 19 of the swivel arm housing 8 has a stepped recess 26, into which a cylindrical friction bushing 27 is inserted such that it is rotationally fixed relative to the swivel arm housing 8; that is, the friction bushing 27 is connected to the stationary housing 10 in a rotationally fixed manner. The friction bushing is manufactured from an intrinsically elastic material, such as thermoplastics, having a relatively high coefficient of friction as compared with metal.

The friction bushing 27 in turn has a stepped recess 28, so that its outside diameter on the end oriented toward the housing 10 is somewhat greater than farther outward.

In the annular gap 21 formed by the outer cylindrical section 18, as well as by the inner cylindrical section 19 on the one hand and the friction bushing 27 on the other, there is a helical spring 33, the ends of which are fixed, one (the helical spring end 30) in a longitudinal groove 29 closed off from the outside in the outer cylindrical section 18 of the swivel arm housing 8 and the other (the end 32) in a bore 31 of the housing 10. The helical spring 33 rests on the friction bushing 27 with only its first few windings, while some distance still remains between the other windings and the recessed portion of the friction bushing 27.

Figure 3:
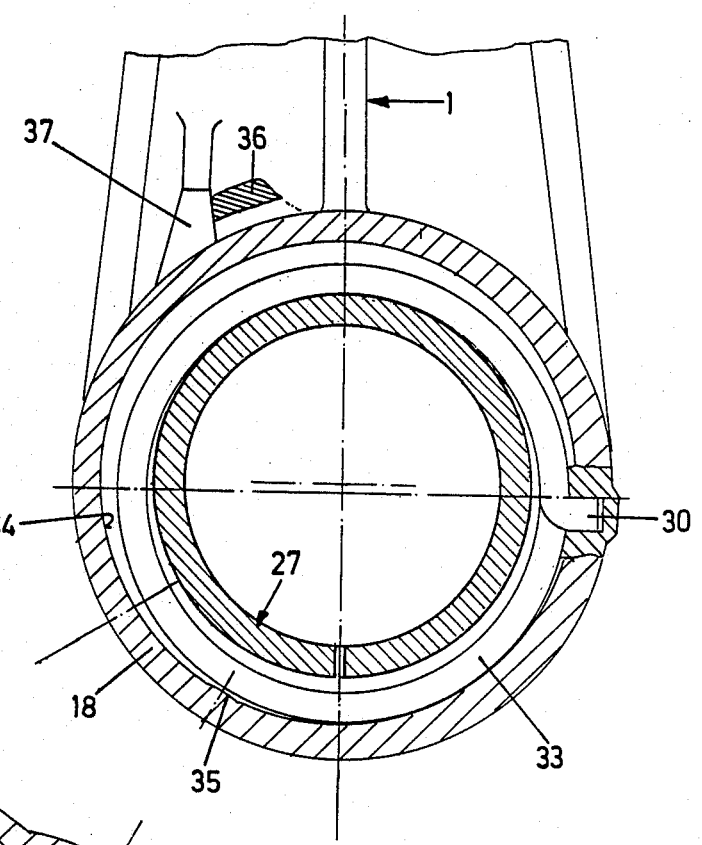
FIG. 3 is a schematic section through the vicinity of the swivel arm housing, taken along the line III—III of the device as shipped.
Figure 5:
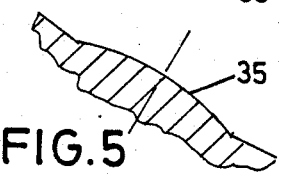
FIG. 5 is an enlarged view of the cam protrusion shown in FIG. 3.
Figure 4:
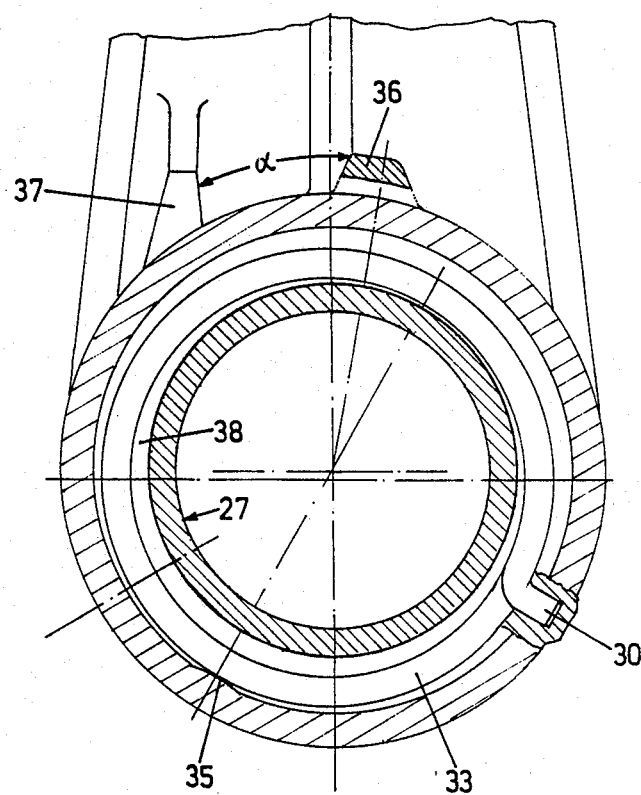
FIG. 4 is a view corresponding to FIG. 3 in the operating state, that is, with the belt tightened.

The following description relates in particular to FIGS. 3–5. These figures show that a cam-like protrusion 35, shown on a larger scale in FIG. 5, is embodied on the inner wall 34 of the outer cylindrical section 18 of the swivel arm housing 8.

In the state as shipped or otherwise delivered, shown in FIG. 3, or in other words when the swivel arm 1 is located in a first end position, defined on the one hand by a stop prong 36 on the stationary housing 10 and on the other by a rib protrusion 37 on the swivel arm 1, the first and second spring winding of the helical spring 33 of he friction bushing 27 rests along a region that is substantially 180° opposite the cam-like protrusion 35.

If the device according to the invention is now fastened to an engine in the manner described, the swivel arm 1 is deflected outward into the opening 4 by the use of a tool, and a belt, not shown in the drawing, is tightened. Because of the belt tension, which is in equilibrium with the tension of the helical spring 33, the swivel arm 1 is deflected outward by an angular range α relative to the housing 10, as shown in FIG. 4. In this outward deflection, the helical spring 33 is supported on the cam-like protrusion 35, and on the approximately opposite side, where it originally rested against the friction bushing 27, it is raised away from the friction bushing, so that an annularly encompassing gap 38 is produced between the helical spring 33 and the friction bushing 27. As a result, in this state corresponding to the basic position in the operating state, no static friction occurs between the friction bushing 27 and the inner cylindrical section 19 of the swivel arm housing 8, so that even small shocks, which would not be sufficient to overcome the static friction, are intercepted and damped.

Figure 10:
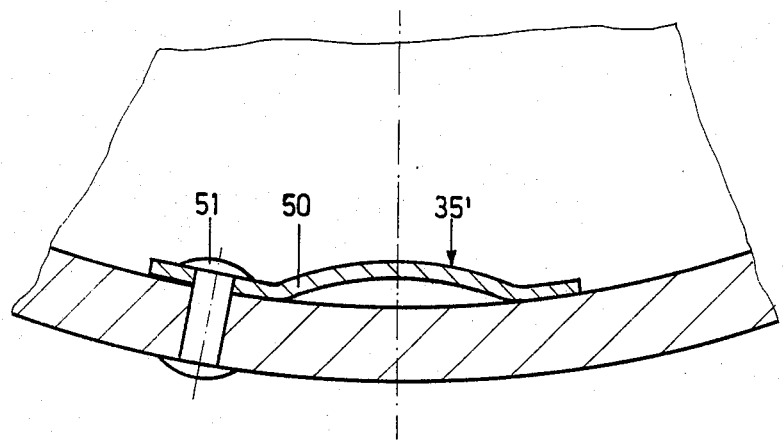
FIGS. 10 and 11 are detailed views taken through a spring-loaded cam-like protrusion.
Figure 11:
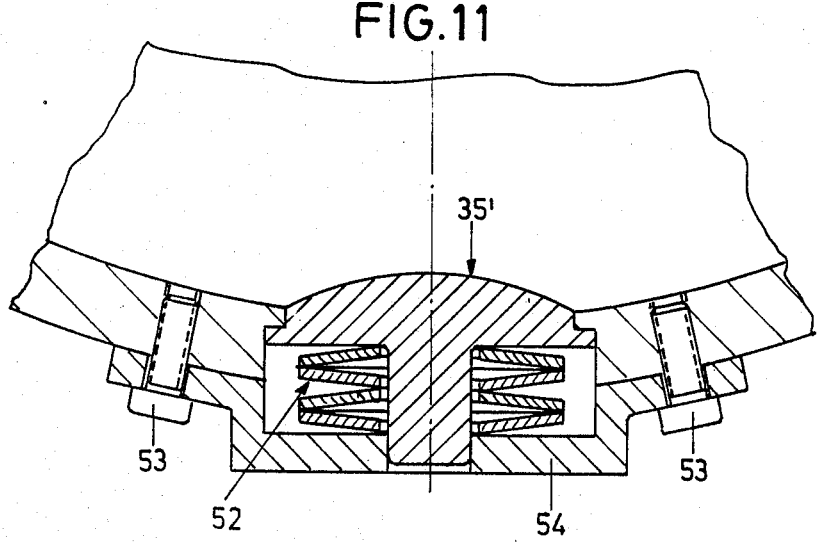

It is not shown in detail in FIGS. 10 and 11 that in accordance with a variant of the invention the cam-like protrusion 35' can also be embodied as a separate housing part, which presses with radial spring loading against the helical spring 33. In the embodiment of FIG. 10, the protrusion 35' is embodied as a leaf spring element 50, which is secured with a rivet 51. In the embodiment of FIG. 11, a plate spring assembly 52 presses against the cam protrusion 35', which is supported against a retaining element 54 secured by means of screws 53.

Figure 6:
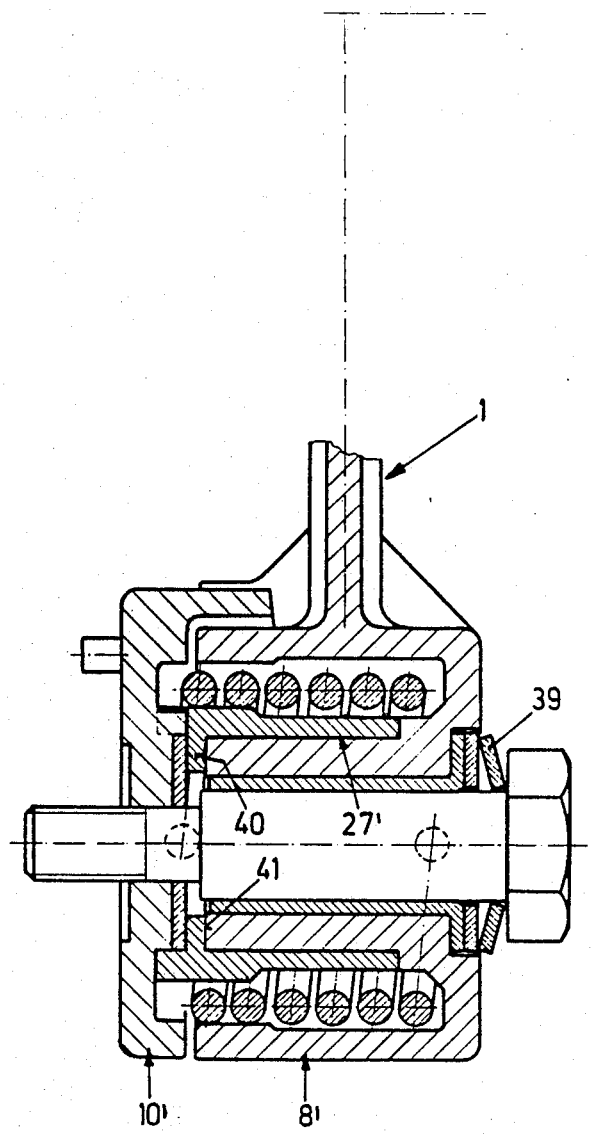
FIG. 6 is a sectional view, corresponding to FIG. 1, of the vicinity of the swivel arm housing in a modified embodiment.

The embodiment shown in FIG. 6 is embodied substantially like the embodiment described above, except that the basic design is laterally reversed.

In this embodiment, instead of the washer 16, a plate spring 39 is provided, which in the state in which the housing 10' or the swivel arm housing 8' is screwed on or in other words secured to the engine, presses the two housings against one another. Also in this embodiment, the friction bushing 27' is embodied such that it has an end wall section 40, which rests on an abutment face 41, in the form of an end face of the swivel arm housing 8', with a friction defined by the plate spring 39. The abutment face 41 is embodied in such a way, deviating from a flat configuration, that it has at least one cam protrusion 60 extending in the axial direction, which rests against a part of the swivel arm housing 8' in such a way that in the basic position of the operating state, the end wall section 40 of the friction bushing 27' does not rest against the abutment face 41, so that in this position, the occurrence of static friction is avoided.

Figure 9:
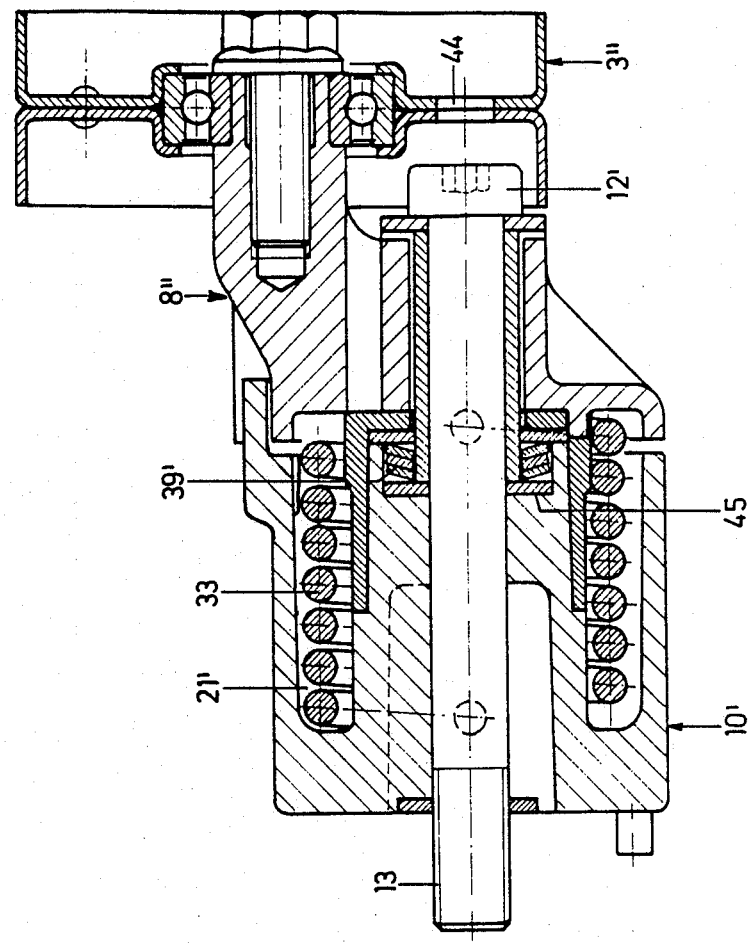
Figure 12A:
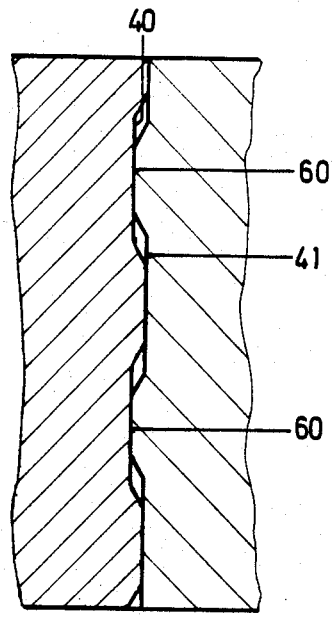
FIGS. 12a–12b and 13a–13b detailed sections of the embodiments of FIGS. 6 and 9, respectively.
Figure 13A:
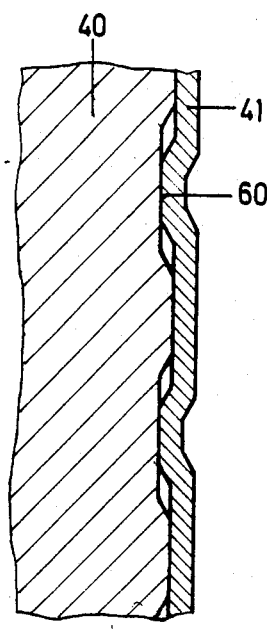
Figure 12B:
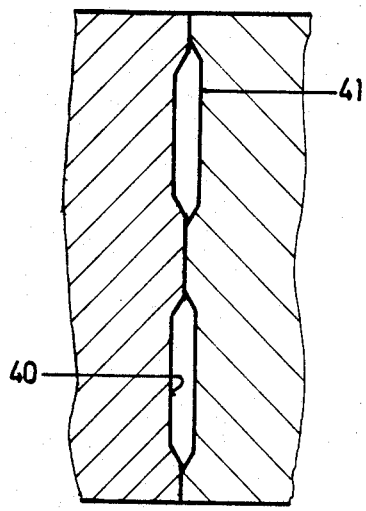
Figure 13B:
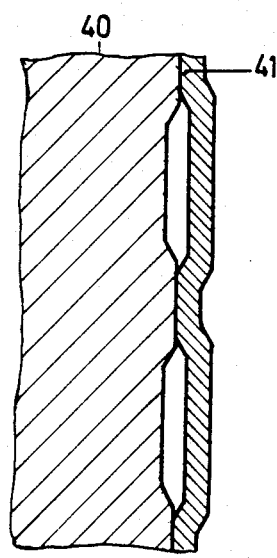

In FIGS. 12 and 13, respective sections through the vicinity of the end wall section 40 or the abutment face 41 are shown, for embodiments in accordance with FIGS. 6 and 9, respectively. FIG. 12a and FIG. 13a each show the basic operational state, while FIGS. 12b and 13b show an outwardly deflected state having increased frictional force.

Figure 7:
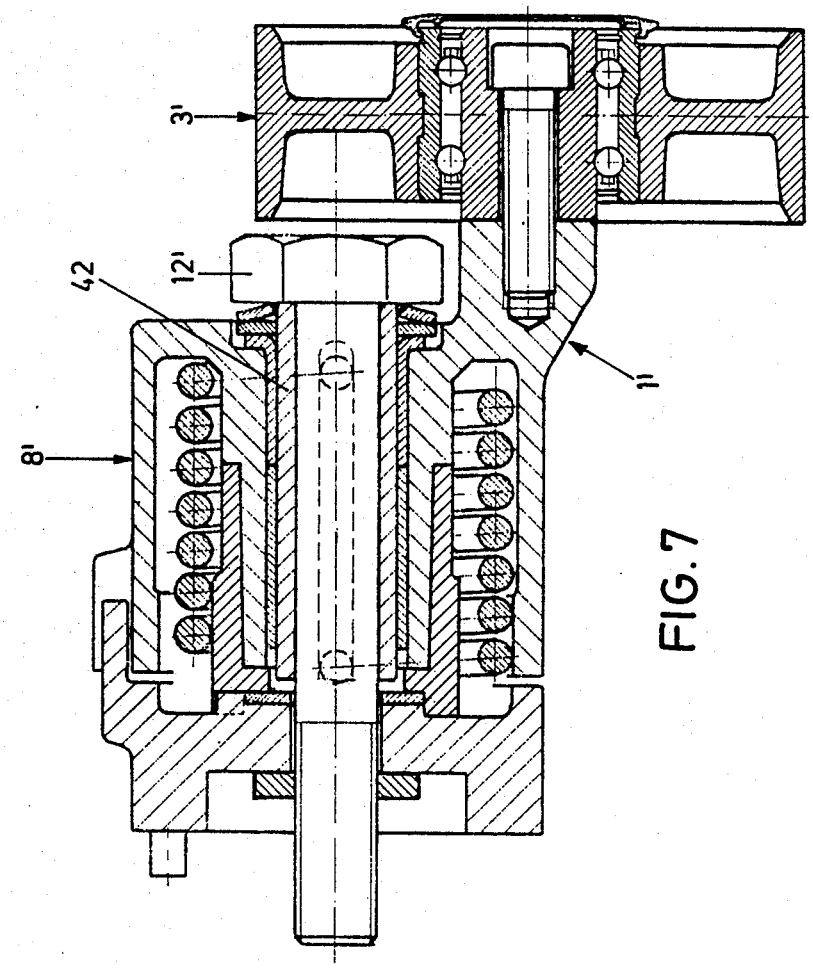
FIGS. 7–9 shows further sectional views of modified embodiments.

In a further embodiment, shown in FIG. 7, instead of the one-piece screw element 12, a conventional screw 12' having a thread is provided, over which a sheath 43 is placed. Also in this embodiment, the swivel arm 1' is made quite short, so that the belt diversion wheel 3' partly covers the swivel arm housing 8'' in the radial direction. In this embodiment, the head of the screw 12' can be grasped from above by means of a wrench for assembly purposes. In these embodiments shown in FIGS. 8 and 9, the belt diversion wheel 3'' has an opening 44, which enables actuation of the screw 12', provided with a socket head, for fastening purposes. In these embodiments shown in FIGS. 8 and 9, plate springs 39' are disposed not beneath the head of the screw 12' but instead are supported against an end face 45 of the housing part 10'. It is also provided in this embodiment that the helical spring 33 is disposed in an annular gap 21' that is accommodated in the stationary housing 10'. Accordingly, this exemplary embodiment shows that a kinematic reversal of the elements essential to the function of the invention between the swivel arm housing 8" and stationary housing 10' can readily be accomplished, while retaining the advantages according to the invention.

Figure 8:
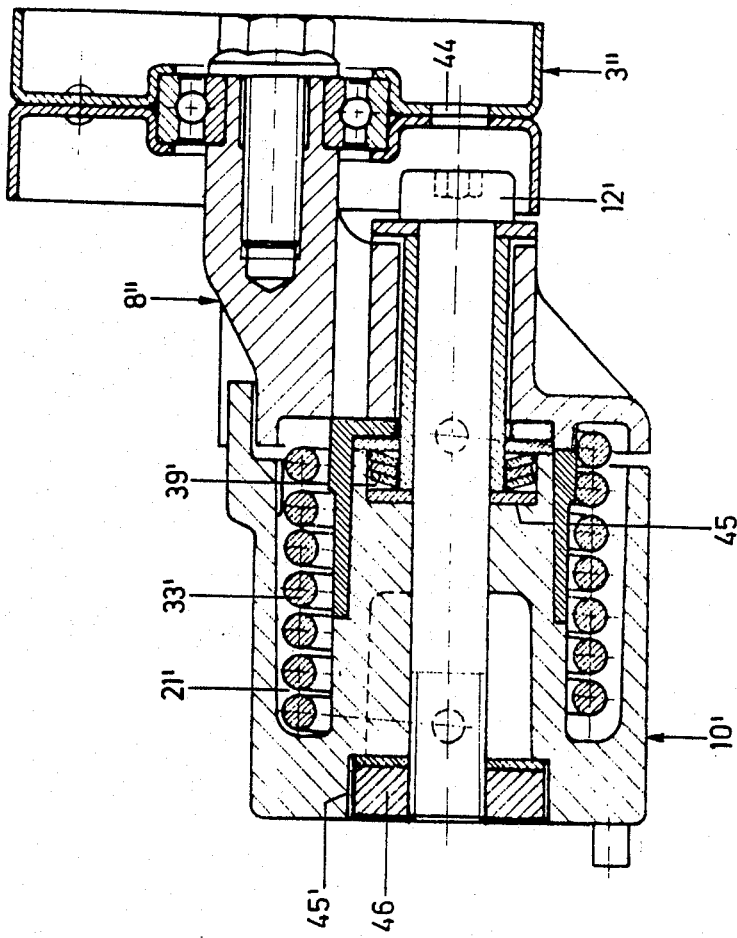

The embodiments of FIGS. 8 and 9 also differ in that in the embodiment of FIG. 9, in accordance with the above-described exemplary embodiments, a threaded portion 13 protrudes beyond the stationary housing 10', while in the embodiment of FIG. 8 the stationary housing 10' has a recess 45', which is engaged either by a retaining arm or by a nut 46 or the like welded to the engine block.

I claim:

1. A tensioning device for belts and the like, in particular on motor vehicle engines, comprising:
    at least two housing parts that can be swivelled relative to one another, one of which is adapted to be mounted in a stationary manner;
    a screw element penetrating the at least two housing parts such that a threaded portion of the screw element protrudes freely from the stationary housing; and
    a washer having a bore and joined to the stationary housing, wherein the screw element engages said bore of said washer.
2. A tensioning device, as defined by claim 1, wherein the screw element forms the swivel bearing.
3. A tensioning device as defined by claim 1, wherein the screw element includes a conventional screw and a sheath partially surrounding said conventional screw.
4. A tensioning device as defined by claim 1, wherein a belt diversion wheel is at least partially in alignment with the housing parts in the axial direction, the belt diversion wheel having an opening for actuating the screw element.
5. A tensioning device as defined by claim 1, wherein the screw element centrally penetrates a swivel bearing.
6. A tensioning device as defined by claim 1, wherein said washer is made of a material selected from the group of plastic and cardboard.

* * * * *